United States Patent [19]

Wickholm et al.

[11] Patent Number: 4,768,866
[45] Date of Patent: Sep. 6, 1988

[54] OPTICAL MAGNIFYING SYSTEM: 4× LOUPE

[75] Inventors: David R. Wickholm; Donald J. Strittmatter, both of Tucson, Ariz.

[73] Assignee: Hughes Aircraft Company, Los Angeles, Calif.

[21] Appl. No.: 936,053

[22] Filed: Nov. 28, 1986

[51] Int. Cl.[4] .................... G02B 25/00; G02B 11/04
[52] U.S. Cl. .................................. 350/410; 350/479
[58] Field of Search ..................... 350/410, 479–481

[56] References Cited

U.S. PATENT DOCUMENTS 4,482,217  11/1984  Nagler .................................. 350/479

Primary Examiner—John K. Corbin
Assistant Examiner—Rebecca D. Gass
Attorney, Agent, or Firm—Robert A. Hays; A. W. Karambelas

[57] ABSTRACT

A four element optical magnifying system (10) is disclosed. The primary lens (12), secondary lens (14), tertiary lens (16), and quaternary lens (18) form an optical system (10) have surfaces shaped to focus upon an object such that a high resolution image is formed at infinity at 4× magnification substantially over the entire field of view.

8 Claims, 1 Drawing Sheet

OPTICAL MAGNIFYING SYSTEM: 4× LOUPE

BACKGROUND OF THE INVENTION

1. Field of the Invention

The present invention relates to a wide field of view optical magnifying system and more particularly to an eye loupe having a magnification power of 4 (4× magnification).

2. Description of Related Art

Visual inspection tools are used in several industrial fields to inspect components for defects which cannot be seen with the naked eye. Many industries have stringent magnification specifications. In the soldering industry and especially in the aerospace circuit board industry, the solder connections must be inspected to meet desired specifications. Visual tools, such as magnifying eye loupes, are used to increase the apparent size of the solder connection viewed. This increase in size better enables an inspector to see and determine whether or not the solder connection meets desired specifications. Other applications will become apparent which utilize magnifying devices for inspection where inspection with the naked eye is inadequate.

Prior magnifying optical systems having 4× magnification exist in the field. These prior magnifiers generally have one to three lens elements and have several disadvantages. The prior eye loupes generally are not true 4× magnifiers and generally have a magnification power of less than what is specified on the magnifier. The magnifiers generally have a small field of view, which view causes severe eye strain in just a short period of time. The viewing distance between the user's eye and the object is generally very short. This close viewing range causes the user to hold the viewed object in close proximity to his face. Generally, the prior eye loupe lenses have distorted imagery as the view traverses from the center to the peripheries of the field of view. The prior lenses are somewhat heavy, have poor resolution, and have chromatic aberrations. Also, prior magnifiers generally limit the eye resolution along the axis of the magnifier. Thus, there is a need in the art to provide an optical magnifying system, having a wide field of view at 4× magnification, and which the operator can easily control during use.

SUMMARY OF THE INVENTION

Accordingly, it is an object of the present invention to overcome the disadvantages of the above art. The new and improved optical magnifying system of the present invention provides the art with a true 4× eye loupe which has a large field of view. Also, the present invention provides the art with a four element eye loupe which decreases distortion in the field of view and corrects chromatic aberrations.

The optical magnifying system includes a primary lens defining an optical axis and positioned a larger than normal predetermined working distance adjacent to the object being viewed. A secondary lens, a tertiary lens; and a quaternary lens are also centered with respect to the optical axis. The primary, secondary, tertiary and quaternary lenses have surfaces which are shaped to focus upon an object such that a high resolution image is formed at infinity at 4× magnification.

In one embodiment of the invention, the lenses of the above system have the following shapes and surfaces. The primary lens is generally a negative convex-concave lens. The secondary lens is generally a positive biconvex lens. The tertiary lens is generally a positive convex-planar lens. The quaternary lens is generally a negative planar-concave lens.

Generally, in the same embodiment, the primary and secondary lenses and the tertiary and quaternary lenses are coupled together to form a first and second doublet. The doublets are positioned with respect to one another such that the positive lenses are adjacent to one another. A space is generally formed between the first and second doublet such that the distance between the first and second doublets is predetermined. Generally, the first doublet is positioned such that the negative lens is at a predetermined working distance adjacent to the object being viewed and the negative lens of the second doublet is positioned at a predetermined distance adjacent to an aperture stop, such as the human eye.

From the subsequent description and the appended claims taken in conjunction with the accompanied drawings, other objects and advantages of the present invention will become apparent to one skilled in the art.

DESCRIPTION OF THE PREFERRED EMBODIMENT

Figure 1:
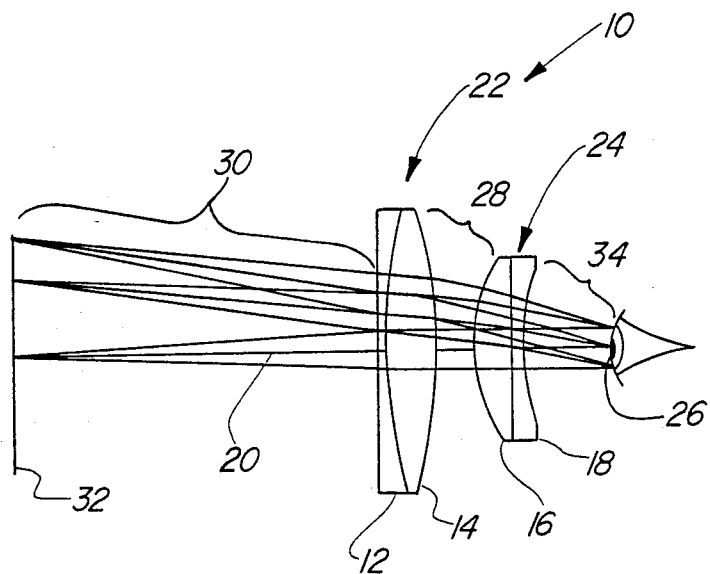
FIG. 1 is a schematic view of an optical magnifying system in accordance with the present invention.

Turning to FIG. 1, a four lens optical magnifying system is illustrated and designated with the reference numeral (10). The system (10) includes a primary lens (12), which is a negative lens, positioned adjacent to a secondary lens (14), which is a positive lens. The secondary lens (14) is positioned adjacent to a tertiary lens (16), which is a positive lens, which, in turn, is positioned adjacent to a quaternary lens (18), which is a negative lens.

The primary lens (12) defines an optical axis (20), which runs through the vertex of the lens. Generally, the primary lens is a convex-concave lens formed from a high dispersion glass material. The primary lens (12) has a predetermined radius of curvature on the convex or front surface of the lens and a predetermined radius of curvature on the concave or back surface of the lens. Also, the primary lens (12) has a predetermined thickness at the vertex and predetermined aperture sizes on the convex front surface and the concave back surface.

The secondary lens (14) is centered with respect to the optical axis (2). Generally, the secondary lens (14) is a biconvex lens formed from a low dispersion glass material. Generally, the secondary lens (14) has a predetermined radius of curvature on the convex or front surface of the lens and a predetermined radius of curvature on the convex or back surface of the lens. The secondary lens (14) has a predetermined thickness at its vertex and predetermined aperture sizes on the convex front and convex back surfaces.

The tertiary lens (16) is centered with respect to the optical axis (20). Generally, the tertiary lens (16) is a convex-planar lens formed from a low dispersion glass material. Generally, the tertiary lens (16) has a predetermined radius of curvature on the convex or front surface and a radius of curvature of infinity on the planar or back surface. Generally, the tertiary lens (16) has a predetermined thickness at its vertex and predetermined aperture sizes on the convex front and planar back surfaces.

The quaternary lens (18) is centered with respect to the optical axis (20). Generally, the quaternary lens (18) is a planar-concave lens formed from a high dispersion glass material. Generally, the quaternary lens (18) has a radius of curvature on the planar or front surface of infinity and a predetermined radius of curvature on the concave or back surface. The quaternary lens (18) has a predetermined thickness at its vertex and predetermined aperture sizes on the planar front and concave back surfaces.

Generally, the primary and secondary lenses (12) and (14) and the tertiary and quaternary lenses (16 and 18) are adhered together, by conventional means, to form a first (22) and a second (24) doublet. The doublets (22) and (24) are oriented such that the positive secondary and tertiary lenses (14) and (16) are positioned adjacent to one another in the optical system (10). The negative primary and quaternary lenses (12) and (18) are positioned such that the primary lens (12) is at a predetermined distance adjacent to the object (32) being viewed and the quaternary lens (18) is positioned at a predetermined distance adjacent to an aperture stop (26). The aperture stop (26) may be an electronic sensor or the like, however, normally the aperture stop (26) is the human eye.

A space (28) is formed between the first and second doublets (22) and (24). The space (28) has a predetermined length measurement between the doublets (22) and (24). The length of the space (28) along with the curvatures, thicknesses and glass types of the lenses (12), (14), (16) and (18) enable the system (10) to perform as a true 4× magnifier.

The effective focal length of system (10) is of a predetermined length. Generally, magnification power is determined by dividing the effective focal length (in inches) into 10 inches. In the present invention, the working distance (30), which is a predetermined distance between the object (32) and the primary lens (12), exceeds 90% of the effective focal length of the system (10). Generally, the distance (34) from the aperture stop (26), or the user's eye to the quaternary lens (18) is of a predetermined distance of approximately 0.6 inch. These two distances, (30) and (34), along with the lens thickness and spacing, enable the system (10) to achieve a total object to eye distance greater than 1.55 times the effective focal length of the system. The lens glass enhances correction of axial and lateral chromatic aberrations. The lens radii minimize spherical aberration as well as providing a flat tangential field and maintaining low distortion over the large diameter object field of view. The present invention displays high resolution from the center of the field of view out to the edge of the field of view, up to a full three inch diameter. The resolution of the device is limited only by the resolution of the user's eye near the center of the field of view. When electronic sensors are used with the system, similiar high performance will result.

A specific prescription for a 4× eye loupe having a four element configuration and a wide field of view is given in the following table:

TABLE 1

| Element Number | Optical Prescription | | | |
|---|---|---|---|---|
| | Glass Type | Radius of Curvature Front/Back | Distance/ Thickness | Aperture Diameter Front/Back |
| (30) Working Distance | | | 2.3684 | |
| (12) Primary Lens | SF15 | 11.3338/3.4639 | 0.0700 | 1.7200/1.7200 |
| (14) Secondary Lens | SK14 | 3.4639/−3.4639 | 0.3200 | 1.7200/1.7200 |
| (28) Space | | | 0.2500 | |
| (16) Tertiary Lens | SK14 | 1.0629/INF | 0.2600 | 1.1000/1.0000 |
| (18) Quaternary Lens | SF15 | INF/1.6242 | 0.0700 | 1.1000/1.0000 |
| (34) Aperture Stop Distance | | | 0.6000 | |
| (26) Aperture Stop | | | | 0.2500 |
| | | Image Distance = Infinity | | |

Note
Positive radius indicates the center of curvature is to the right. Negative radius indicates the center of curvature is to the left.
Dimensions are given in inches.
Thickness is axial distance to next surface.
Reference Wavelength = 589.0 NM
Spectral Region = 486.0–656.0 NM Advantages provided by the examples of the preferred embodiment of this invention include the lightweight compact size, and a high resolution true 4× magnification over a field of view which is enlarged over that of existing eye loupes. Also, the distance between the viewer and the object and the object and loupe are increased, permitting additional ease of use.

Specific utility with the four element eye loupe of this invention includes the inspecting of solder connections in varying industries, particularly, the inspection of solder connections on circuit boards and the like where naked eye visualization cannot detect the imperfections in the solder connections.

While it will be apparent that the preferred embodiment is well calculated to fill the above stated objects, it will also be appreciated that the present invention is susceptible to modification, variation, alteration, and change without varying from the proper scope and fair meaning of the subjoined claims.

What is claimed is:

1. An optical magnifying system comprising:
    a primary lens (12), said primary lens being a negative convex-concave lens and defining an optical axis (20) said primary lens (12) being disposed a predetermined working distance from the object being viewed;
    a secondary lens (14), said secondary lens (14) being a positive biconvex lens disposed adjacent said primary lens (12) and centered with respect to said optical axis (20);
    a tertiary lens (16), said tertiary lens (16) being a negative planar-concave lens disposed proximate said secondary lens (14) and centered with respect to said optical axis (20); and
    a quaternary lens (18), said quaternary lens (18) being a negative planar-concave lens disposed adjacent said tertiary lens (16) and centered with respect to said optical axis (20), said quaternary lens being disposed with respect to said secondary lens (14)

such that said tertiary lens (16) is disposed therebetween said primary (12), secondary (14), tertiary (16) and quaternary (18) lenses having surfaces shaped to focus upon said object such that an image thereof is formed at infinity at 4× magnification.

2. The optical system as claimed in claim 1 wherein said primary lens (12) and said quaternay lens (18) are high dispersion glass lenses and said secondary lens (14) and said tertiary lens (16) are low dispersion glass lenses.

3. The optical system of claim 1, wherein said system forms a high resolution image substantially over the entire field of view of the system.

4. The optical system of claim 1 wherein said system is circular in shape and adapted to be hand-held.

5. The optical system according to claim 1 wherein said primary (12) and secondary (14) lenses form a first doublet having one positive lens and the other, a negative lens, and said tertiary (16) and quaternary lenses (18) form a second doublet (24), having one positive lens and the other a negative lens.

6. The optical system according to claim 5 wherein said doublets (22) and (24) are positioned such that said positive lenses are adjacent to one another.

7. The optical system according to claim 6 wherein a space (28) having a predetermined length is formed between said positive lenses.

8. The optical system according to claim 1 wherein said system conforms substantially to the following table in which all elements have the characteristic values shown, proceeding from the object to the viewer:

TABLE 1

| Element Number | Glass Type | Optical Prescription Radius of Curvature Front/Back | Distance/ Thickness | Aperture Diameter Front/Back |
| --- | --- | --- | --- | --- |
| (30) Working Distance | | | 2.3684 | |
| (12) Primary Lens | SF15 | 11.3338/3.4639 | 0.0700 | 1.7200/1.7200 |
| (14) Secondary Lens | SK14 | 3.4639/−3.4639 | 0.3200 | 1.7200/1.7200 |
| (28) Space | | | 0.2500 | |
| (16) Tertiary Lens | SK14 | 1.0629/INF | 0.2600 | 1.1000/1.0000 |
| (18) Quaternary Lens | SF15 | INF/1.6242 | 0.0700 | 1.1000/1.0000 |
| (34) Aperture Stop Distance | | | 0.6000 | |
| (26) Aperture Stop/eye | | | | 0.2500 |
| | | Image Distance = Infinity | | |

Note
Positive radius indicates the center of curvature is to the right. Negative radius indicates the center of curvature is to the left.
Dimensions are given in inches.
Thickness is axial distance to next surface.
Reference Wavelength = 589.0 NM
Spectral Region = 486.0–656.0 NM

* * * * *